UNITED STATES PATENT OFFICE.

VICTOR XICOVICH, OF SEATTLE, WASHINGTON.

ADHESIVE COMPOUND.

1,077,576.     Specification of Letters Patent.     Patented Nov. 4, 1913.

No Drawing.     Application filed February 13, 1913. Serial No. 748,257.

*To all whom it may concern:*

Be it known that I, VICTOR XICOVICH, a citizen of the United States, and resident of the city of Seattle, in the county of King and State of Washington, have invented certain new and useful Improvements in Adhesive Compounds, of which the following is a specification.

My invention relates to cements, and consists of an improved cement which is especially adapted for securing fabrics, such, for instance as linoleum, to metal surfaces.

My invention comprises the cement made in essentially the proportions and of the ingredients combined in the manner herein set forth.

The object of my invention is to produce a superior cement for the class of uses mentioned, which shall be of reasonable cost and effective in holding the materials joined thereby, and particularly one which will be able to stand higher temperatures before losing its adhesiveness.

In compounding my cement I make use of the following ingredients in the proportions and compounded in the manner stated. Of copal varnish I take six parts and rosin three parts, which I first combine by heating, until the mass becomes fluid. After this mixture has cooled I add two and one half (2½) parts of copal varnish and stir well. I then heat the mass and add five parts of Portland cement, this being well stirred in. The better the grade of copal which is used in making the varnish, the better is the quality of the cement made therefrom. The quality of the copal which appears to be most important, is its high fusing point as compared with other resinous gums.

The cement so made will remain soft for a considerable length of time if kept in a mass. When it is to be used, it is spread upon the surfaces to be joined, in such thickness as will form an appreciable layer and one which will insure filling all depressions in the bodies to be joined. Pressure should be applied to hold these bodies together for a considerable time, preferably from one to two weeks.

In using this cement it is not necessary to heat up the materials to be cemented together, but the cement may be applied to cold surfaces and be itself cold. To loosen the surfaces so secured, they should be heated. When the temperature reaches the neighborhood of 150° F., the cement will soften so that the surfaces may be separated, although its adhesive qualities are by no means destroyed.

Stated in percentages, the proportions above named in the finished product, would be approximately, copal varnish, 51½%; rosin, 18⅛%; cement, 30⅜%.

What I claim as my invention is:

The herein described cement made by combining six parts copal varnish with three parts of rosin by the application of heat until the mass becomes fluid, then adding to this, after cooling, an additional two and a half parts of copal varnish and five parts of Portland cement.

In testimony whereof I have hereunto affixed my signature at Seattle, Washington, this 7th day of February, 1913.

VICTOR XICOVICH.

Witnesses:
  HENRY L. REYNOLDS,
  GEORGE H. MORSE.